United States Patent
Maeda

(10) Patent No.: US 7,684,077 B2
(45) Date of Patent: Mar. 23, 2010

(54) IMAGE PROCESSING APPARATUS AND IMAGE PROCESSING METHOD

(75) Inventor: Etsuko Maeda, Ohta-ku (JP)

(73) Assignee: Canon Kabushiki Kaisha, Tokyo (JP)

( * ) Notice: Subject to any disclaimer, the term of this patent is extended or adjusted under 35 U.S.C. 154(b) by 1102 days.

(21) Appl. No.: 11/191,581

(22) Filed: Jul. 28, 2005

(65) Prior Publication Data

US 2006/0028663 A1    Feb. 9, 2006

(30) Foreign Application Priority Data

Aug. 9, 2004    (JP)    ............ 2004-232725

(51) Int. Cl.
- *G06K 1/00* (2006.01)
- *G06F 15/00* (2006.01)
- *H04N 1/46* (2006.01)

(52) U.S. Cl. ............ 358/1.18; 358/1.17; 358/1.2; 358/540

(58) Field of Classification Search .......... 358/1.2, 358/1.9, 1.18, 1.12, 1.16, 1.17, 452, 453, 358/462, 504, 518, 537, 538, 540

See application file for complete search history.

(56) References Cited

U.S. PATENT DOCUMENTS

| | | | |
|---|---|---|---|
| 6,985,245 B1 * | 1/2006 | Takahashi | 358/1.15 |
| 7,280,249 B2 * | 10/2007 | Ohta | 358/1.9 |
| 2003/0081274 A1 * | 5/2003 | Yamamoto | 358/504 |
| 2005/0117948 A1 * | 6/2005 | Hatta et al. | 400/62 |
| 2005/0219561 A1 * | 10/2005 | Haikin | 358/1.9 |

FOREIGN PATENT DOCUMENTS

| | | |
|---|---|---|
| JP | 09-018691 | 1/1997 |
| JP | 11-275299 | 8/1999 |
| JP | 2001--86287 | 3/2001 |
| JP | 2004-056658 | 2/2004 |

* cited by examiner

*Primary Examiner*—James A Thompson
(74) *Attorney, Agent, or Firm*—Canon USA, Inc IP Div.

(57) ABSTRACT

An image processing method includes steps of acquiring information about image conditions, such as resolution settings, supported by a first print device for printing image data; generating an image data item corresponding to each acquired image condition; determining an image attribute, such as a character image or a dot image, included in each of the generated image data items; trimming an image in an area including the image attribute from each of the image data items; laying out the trimmed images on prepared template data; and printing out the template data using a second print device different from the first print device.

7 Claims, 10 Drawing Sheets

A3

A4

(A)

A5

A4

(B)

NONSTANDARD SIZE

A4

(C)

USE NUMBER OF DIVISIONS
FOR CLOSEST STANDARD SIZE

PHOTOGRAPH  CHARACTER IMAGE

DOT PIXELS

400dpi

600dpi

NUMBER OF INFORMATION ITEMS IN BLOCKS

| CHARACTER IMAGE | NUMBER OF PIXELS "m1" |
| DOT | NUMBER OF PIXELS "a1" |
| PHOTOGRAPH | NUMBER OF PIXELS "s1" |

| | A | B | C | D | E | F |
|---|---|---|---|---|---|---|
| CHARACTER IMAGE | m1 | m2 | m3 | m4 | m5 | m6 |
| DOT | a1 | a2 | a3 | a4 | a5 | a6 |
| PHOTOGRAPH | s1 | s2 | s3 | s4 | s5 | s6 |

◯ MAXIMUM VALUE

IMAGE PROCESSING APPARATUS AND IMAGE PROCESSING METHOD

BACKGROUND OF THE INVENTION

1. Field of the Invention

The present invention relates to image processing apparatuses and image processing methods, and particularly to an image processing apparatus and an image processing method for outputting a sample of an image to be printed out.

2. Description of the Related Art

When an image is to be printed on a printing apparatus (print device), it is customary to pre-check what the print result will be like depending on a print condition, such as the resolution, set in the printing apparatus. The most common way to do this includes previewing a print result on a display unit and printing out a sample image.

It is also known that print information can be sent to a printing apparatus, such as a multi-function peripheral (MFP), connected via a network to perform printing on the printing apparatus. If a function is not available with a first printing apparatus, image information can be transmitted to a second printing apparatus connected to the first printing apparatus via a network to perform printing on the second printing apparatus provided with the function. Furthermore, sending print information to a remote facsimile machine, functioning as a printing apparatus, to perform printing on the facsimile machine is another example.

As described above, previewing or printing a sample image to pre-check a print result may be performed in a case where print information is transmitted from one printing apparatus to another for printing. In this case, it is preferable to learn in advance a print condition, such as resolution, set in a printing apparatus as the transmission destination (hereinafter, referred to as the destination printing apparatus) so that appropriate print information for the set print condition can be sent. In this manner, a print result can be pre-checked by seeing what the print result will be like with the print condition set in the destination printing apparatus through previewing and sample printing, so that the print information to be sent can be adjusted to the print condition set in the destination printing apparatus. For example, the best resolution setting for print information that gives an appropriate print result can be selected from among those available in the destination printing apparatus by pre-checking the print result through previewing and sample printing.

Even if a plurality of print conditions (e.g., resolution settings) is available in the destination printing apparatus, the best print condition cannot be selected without pre-checking the print result through previewing or sample printing, and hence print information adjusted to the best print condition cannot be generated.

If this is the case, for example, print information with lower resolution than desired may be transmitted, causing the destination printing apparatus to output a print result with low image quality. Further, print information with higher resolution than required may be transmitted, causing the amount of transmission and accordingly the transmission time to increase.

In a case where printing is performed by transmitting print information from one printing apparatus to another, some technologies for allowing the print information to be set according to a print condition in the destination printing apparatus are known.

For example, Japanese Patent Laid-Open No. 9-018691 discloses technology for allowing a transmitter to perform image conversion processing, such as changing a print density and dividing an image, according to a receiver FAX machine. Furthermore, it also describes image conversion processing for printing an image based on image data to be transmitted on one page of print sheets used in the receiver FAX machine. With this function, an image to be outputted to the destination facsimile machine can be pre-checked on the transmitter facsimile machine.

In addition, Japanese Patent Laid-Open No. 2001-086287 discloses technology for allowing a read-scanning control section in a transmitter to recognize the resolution of a destination printing apparatus in order to perform efficient reading with appropriate resolution adjusted to the resolution of the destination printing apparatus. Thus, the number of scanning operations, the tilt angle of an optical plate, and the scanning speed in the subscanning direction are determined based on the recognized resolution.

Furthermore, Japanese Patent Laid-Open No. 11-275299 describes technology for allowing an image-reading apparatus connected to a plurality of computers and printing apparatuses via a network to issue an operation command specific to each of the computers and printing apparatuses that have received images without changing a program of the image reading apparatus.

In addition, Japanese Patent Laid-Open No. 2004-056658 describes technology for allowing a printing apparatus, functioning as a transmission source, to acquire information about resolution with which a destination printing apparatus can perform printing and thereby to display on a display unit thereof an image adjusted to the resolution of the destination printing apparatus.

However, some printing apparatuses capable of transmitting and receiving data are not provided with display units for previewing. Further, display units may not be used for some printing apparatuses due to restrictions on their footprints. With these printing apparatuses, even if a user has selected a print condition, such as resolution, the user cannot preview an image for judging the print condition on a screen. Even with these printing apparatuses for which no display units can be used, a print result based on a print condition available in a destination apparatus can be checked by printing a sample image on a print medium.

However, in order to check a plurality of print conditions, such as a plurality of resolution settings, available in the destination printing apparatus, a sample based on each of the print conditions needs to be printed on one sheet of paper. In this case, the larger the number of samples to be printed out, the higher the operating cost. Furthermore, the user is required to perform the time-consuming, tiring work of comparing many sample images to select the best print condition. In particular, if a plurality of resolution settings is available as print conditions, sample images with different resolution settings are printed out on different sheets of paper. In this case, the user needs to take a long time to find differences among the plurality of printed sample images with different resolution settings by carefully looking at each of the sample images printed on different sheets of paper.

This drawback can be overcome by printing images based on a plurality of print conditions on one single sheet of paper. However, this approach has a disadvantage in that the size of each image printed on one sheet of paper may be too small.

This may cause the user to have difficulty in finding differences among the images printed with different print conditions.

SUMMARY OF THE INVENTION

The present invention is directed to an image processing apparatus and an image processing method for printing sample images based on a plurality of image conditions on a single print sheet of paper to allow differences in the image conditions among the printed images to be easily identified.

The present invention includes the following features.

According to one aspect of the present invention, an image processing apparatus for generating image data having a plurality of image conditions from images read out via a scan device and for transmitting the image data to a first print device includes: a generation unit configured to generate image data items for sample printing based on the images read out via the scan device, the image data items corresponding to a plurality of image conditions; a division unit configured to divide each of the generated image data items for sample printing based on a number of image conditions supported by the first print device and a number of image attributes for sample printing; a selection unit configured to select an image area associated with each of the image attributes from the image data item corresponding to each of the image conditions; a combination unit configured to combine images in the selected image areas on a template having areas divided according to the image condition and the image attribute; and a control unit configured to control a second print device to print the template having the images combined thereon as the image data items for sample printing.

According to another aspect of the present invention, an image processing method for generating image data having a plurality of image conditions from images read out using a scan device and for transmitting the image data to a first print device includes steps of: generating image data items for sample printing based on images read out using the scan device to pre-check a print result with the first print device, the image data items corresponding to a plurality of image conditions; dividing each of the generated image data items for sample printing based on a number of image conditions supported by the first print device and a number of image attributes for sample printing; selecting an image area associated with each of the image attributes from the image data item corresponding to each of the image conditions; combining images in the selected image areas on a template having areas divided according to the image condition and the image attribute; and causing a second print device to print the template having the images combined thereon as the image data items for sample printing.

According to yet another aspect of the present invention, an image processing program stored on a recording medium causes a computer to perform the above-described image processing method.

According to still another aspect of the present invention, an image processing apparatus for transmitting image data to a first print device includes: an acquisition unit configured to acquire information about a resolution supported by the first print device to print the image data; a generation unit configured to generate an image data item corresponding to each resolution acquired by the acquisition unit; a determination unit configured to determine an image attribute included in each image data item generated by the generation unit; a trim unit configured to trim an image in an area including the image attribute from each image data item; a layout unit configured to lay out the images trimmed by the trim unit on prepared template data such that the images can be printed on one sheet of paper; and a control unit configured to control a second print device, different from the first print device, to print out the template data.

According to still another aspect of the present invention, an image processing method for transmitting image data to a first print device includes steps of: acquiring information about a resolution supported by the first print device to print the image data; generating an image data item corresponding to each resolution acquired in the acquiring step; determining an image attribute included in each image data item generated in the generating step; trimming an image in an area including the image attribute from each image data item; laying out the trimmed image on prepared template data such that the image can be printed on one sheet of paper; and printing out the template data using a second print device different from the first print device.

According to still another aspect of the present invention, an image processing apparatus for performing sample output of an output result of image data with a local device, where the image data is transmitted from the local device to a print device and printed with the print device, includes: a retaining unit configured to retain template data for sample output; an acquisition unit configured to acquire information about resolutions supported by the print device to print the image data; a generation unit configured to generate an image data item corresponding to each resolution acquired by the acquisition unit; a trim unit configured to trim an image area from the image data item generated by the generation unit; and a combination unit configured to combine images in the trimmed image area on the template data such that the images can be printed on one sheet of paper.

According to still another aspect of the present invention, an image processing method for performing sample output of an output result of image data with a local device, where the image data is transmitted from the local device to a print device and printed with the print device, includes steps of: retaining template data for sample output; acquiring information about resolutions supported by the print device for printing the image data; generating an image data item corresponding to each of the acquired resolutions; trimming image areas from the generated image data items; and combining images in the trimmed image areas on the template data such that the images can be printed on one sheet of paper.

Further features of the present invention will become apparent from the following description of exemplary embodiments (with reference to the attached drawings).

BRIEF DESCRIPTION OF THE DRAWINGS

The accompanying drawings, which are incorporated in and constitute a part of the specification, illustrate embodiments of the invention and, together with the description, serve to explain the principles of the invention.

DESCRIPTION OF THE EMBODIMENTS

Embodiments of the present invention will now be described in detail in accordance with the accompanying drawings.

Figure 1:
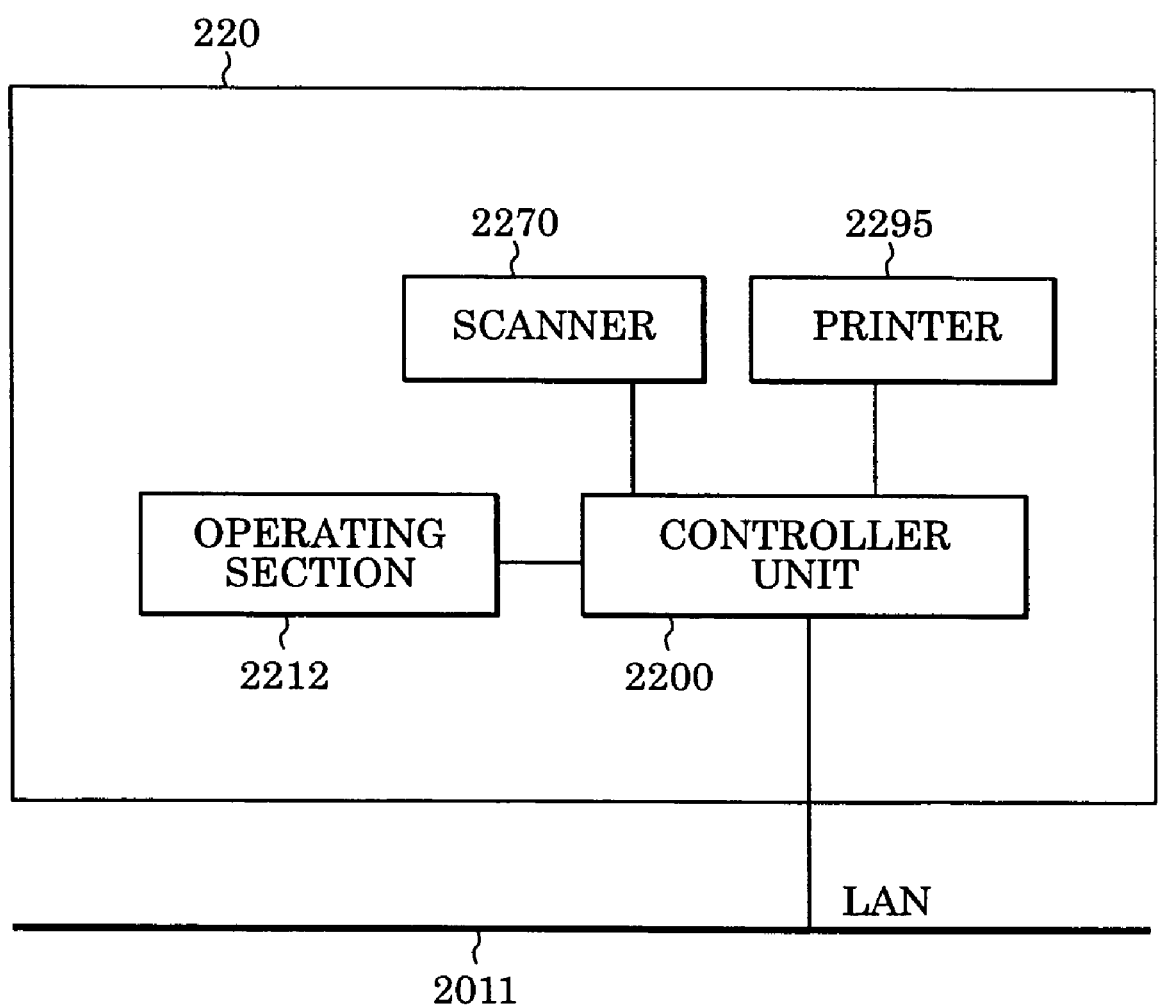
FIG. 1 is a block diagram depicting the structure of a print system according to one embodiment of the present invention.

FIG. 1 is a block diagram depicting the structure of a printing system according to one embodiment of the present invention.

Referring to FIG. 1, a multi-function peripheral (MFP) 220 includes a scanner 2270, which is an image input device, a printer 2295, which is an image output device, a controller unit 2200, and an operating section 2212 functioning as a user interface. The printer 2295 of the MFP 220 includes an electrophotographic print mechanism for sample printing (to be described below with reference to FIG. 3), as well as normal printing. In the present embodiment, the printing method is not limited to this electrophotographic technology. Alternatively, for example, an ink-jet print mechanism can also be used. The MFP 220 is connected via a LAN 2011, functioning as a network, to other printing apparatuses (not shown in the figure), such as another MFP, a standard printer, and a facsimile machine. With this structure, the MFP 220 can transmit print information to another printing apparatus connected to the LAN 2011 to print out the print information on the other printing apparatus. In this case, as described below with reference to FIG. 3, the MFP 220 performs sample output based on resolution settings available in the printing apparatus that prints out the print information.

Figure 2:
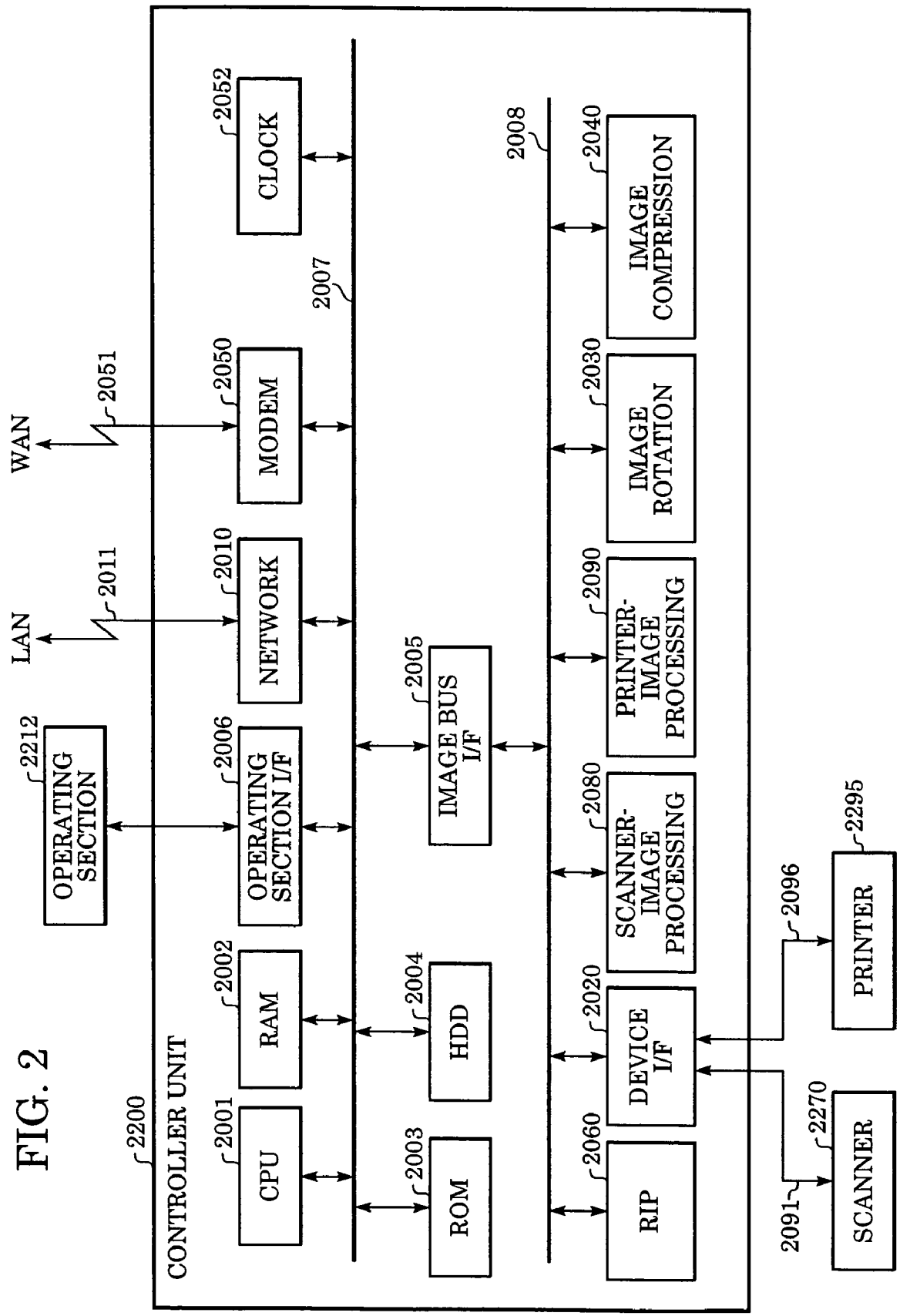
FIG. 2 is a block diagram depicting in detail the structure of a controller unit of an MFP shown in FIG. 1.

FIG. 2 is a block diagram depicting in detail the structure of the controller unit 2200 of the MFP 220 shown in FIG. 1.

Referring to FIG. 2, the controller unit 2200 is connected to the scanner 2270 and the printer 2295. The controller unit 2200 is also connected to the LAN 2011 and a public network (WAN) 2051. With this structure, the controller unit 2200 can acquire, for example, information about another printing apparatus connected via the network.

Figure 3:
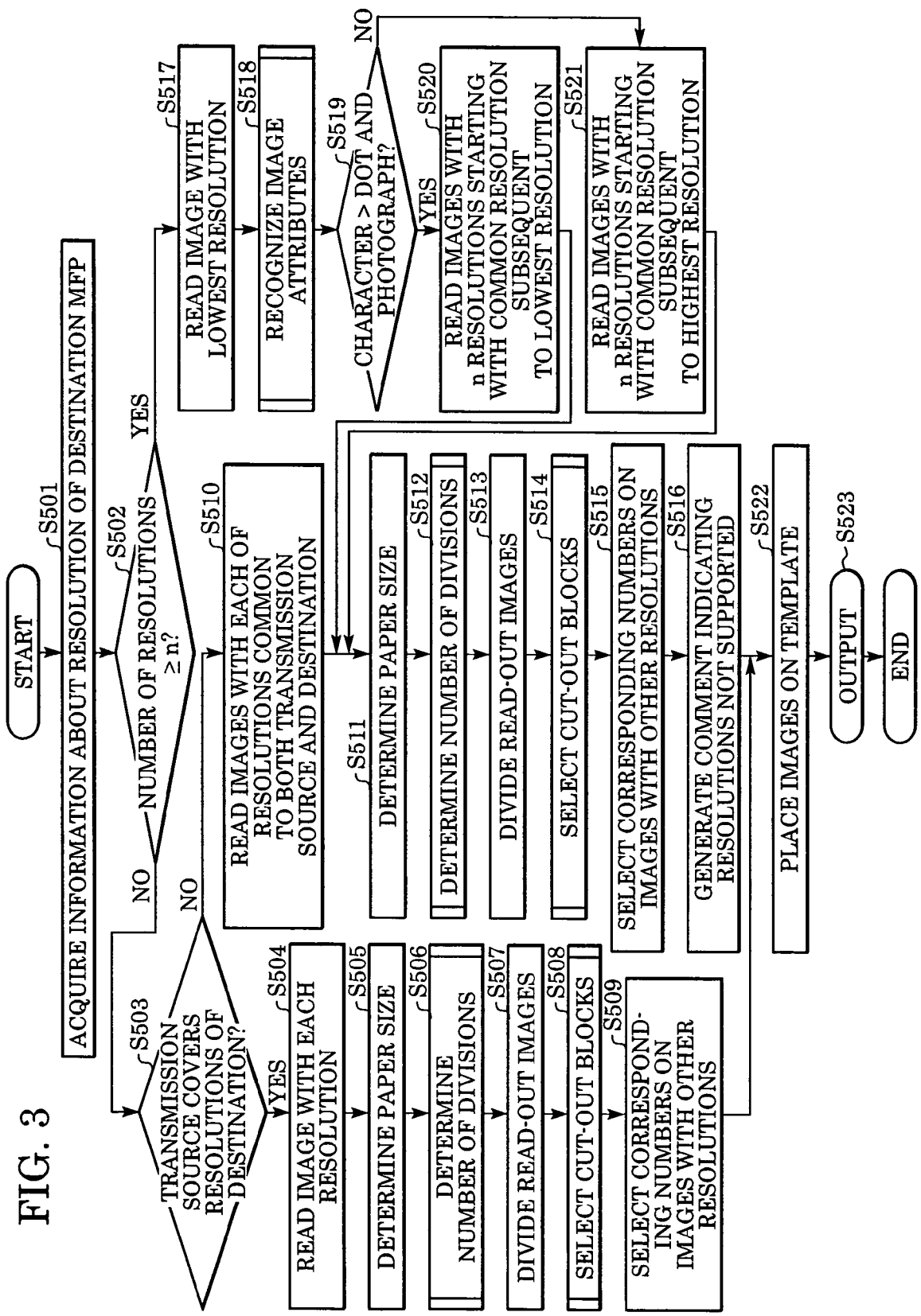
FIG. 3 is a flowchart illustrating a processing procedure from image reading to sample printing according to one embodiment of the present invention.

In the controller unit 2200, a CPU 2001 controls the entire system of the control unit, including control of the timing according to clocks generated by an internal clock 2052. Furthermore, the CPU 2001 controls the performance of the processing described below with reference to FIG. 3 according to a program. A RAM 2002 is a system working memory used to carry out processing by the CPU 2001. Furthermore, the RAM 2002 is an image memory for temporarily storing image data, and can store images read-out with the scanner 2270. A ROM 2003 functions as a boot memory storing a boot program of the system. An HDD 2004 is a hard disk drive. System software, image data, an image processing program, information about the number of divisions for each sheet of paper, a predetermined comment, a template, and so on, to be described later with reference to FIG. 3, are stored in the hard disk drive.

An operating section I/F 2006 controls an interface with the operating section (UI) 2212, and outputs data such as a screen to be displayed on the operating section 2212 to the operating section 2212. Furthermore, the operating section I/F 2006 sends to the CPU 2001 information input by a user via the operating section 2212.

A network interface 2010 controls connection to the LAN 2011, and inputs and outputs information to and from the LAN 2011. A modem 2050 controls connection to the public network 2051 to input and output information to and from the public network. The above-described devices are arranged on a system bus 2007.

An image bus interface 2005 is a bus bridge that connects the system bus 2007 to an image bus 2008 for transferring image data at high speed and converts a data structure.

The image bus interface 2005 includes a PCI bus or IEEE 1394. The devices described below are connected to the image bus interface 2005. A raster-image processor (RIP) 2060 converts image information transmitted from the network into a bit-mapped image. A device I/F 2020 connects the scanner 2270 and the printer 2295 to the controller unit 2200 to convert between synchronous system and asynchronous system of image data.

A scanner-image processing section 2080 performs recognition, correction, processing, and editing of input image data. According to this embodiment, the scanner-image processing section 2080 controls processing related to image division, image-area separation, and sample extraction to be described below with reference to FIG. 3. A printer-image processing section 2090 performs processing on printout image data such as printer correction, resolution conversion, and addition of electronic information. An image rotation section 2030 performs rotation of image data. An image-compression section 2040 performs JPEG compression/decompression processing on multilevel image data and JBIG-, MMR-, and MH-based compression processing on binary image data. The clock 2052 displays a time and manages the standard time of a weekly timer function.

Sample printing based on the above-described structure according to one embodiment of the present invention will now be described. According to this embodiment, image data read out with the scanner 2270 is transmitted to another printing apparatus (an MFP in this embodiment) connected to the LAN 2011. Before the image data is transmitted to the other printing apparatus for printing, sample printing is carried out based on resolution settings (print conditions) available in the other apparatus that is responsible for printing.

FIG. 3 is a flowchart illustrating a processing procedure from image reading to sample printing. First, the user of the MFP 220, functioning as the transmission source, sets in the scanner 2270 a desired page to be outputted as a sample and reads the page. In this case, it is assumed that the destination printing apparatus that is to receive print data to perform printout has been identified by the user operating the operating section 2212. It should be noted, however, that the destination printing apparatus may be specified after the desired page has been read.

Upon the start of reading the page, the current processing is initiated in step S501, where the MFP 220 acquires information about the resolution performance available in the MFP that is the destination printing apparatus (hereinafter, referred to as the destination MFP). This information includes information about resolution performance such as 200 dpi and 300 dpi, as well as the number of resolutions available in the destination MFP. Here, a known structure can be used for the above-described acquisition processing, and thus a description of the acquisition processing is omitted.

Next, in step S502, it is determined whether the number of resolutions included in the acquired information about resolution performance is equal to or greater than the number of resolutions allowed for a template retained in the MFP 220.

Figure 4:
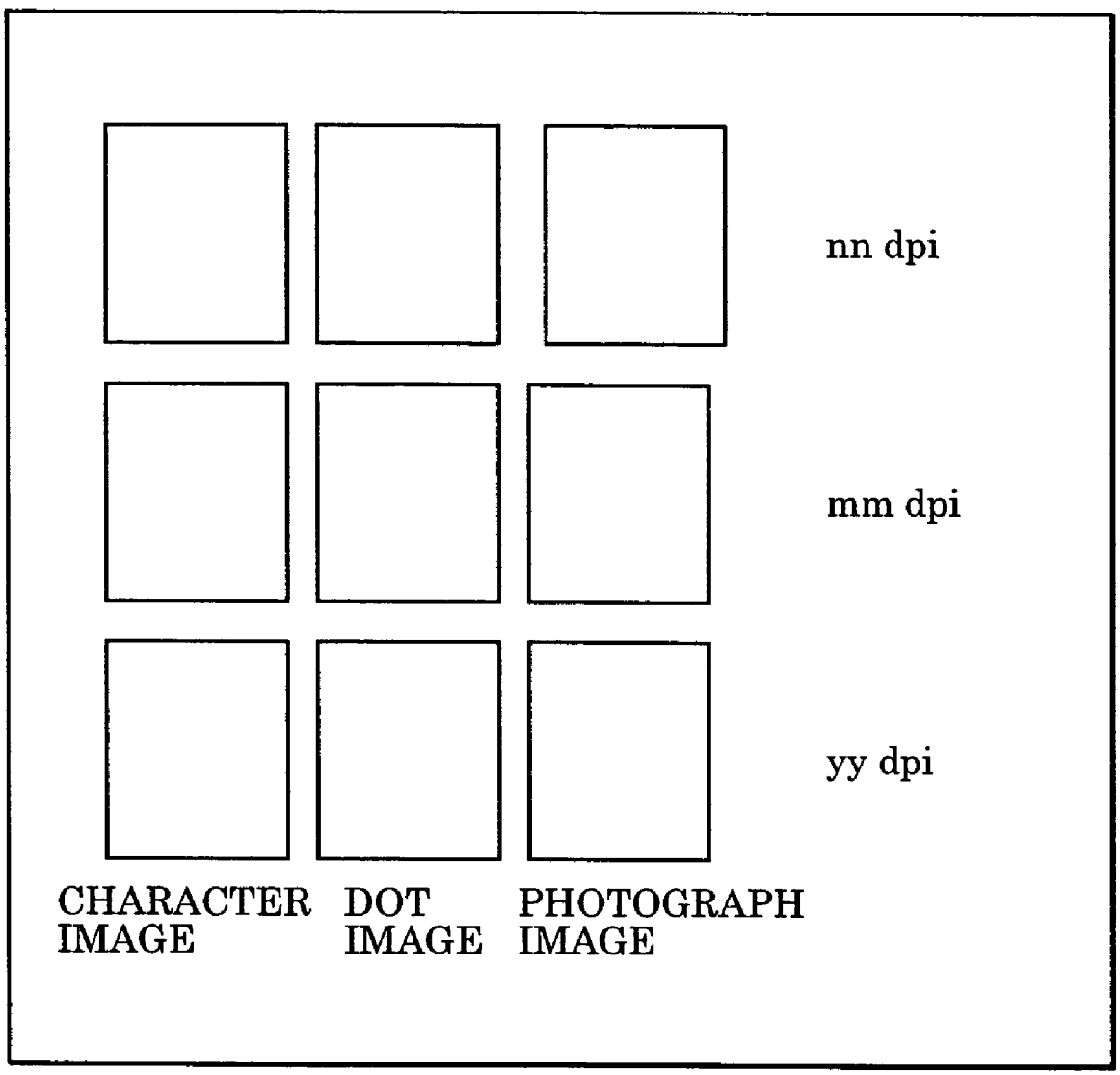
FIG. 4 is a schematic diagram depicting a template used in this embodiment.

FIG. 4 is a schematic diagram depicting a template used in this embodiment. First, according to this embodiment, sample images with three resolutions are output on one print sheet of paper, as shown in FIG. 4. Although three resolutions nn, mm, and yy are shown in FIG. 4, these resolutions do not indicate particular resolutions, but correspond to the resolutions selected in steps S504 and S510 or steps S520 and S521, as is apparent from the description below. In this manner, a template for three resolutions is prepared. As seen in the processing in step S502 to be described below, the number of resolutions with which images to be output as samples are stored on the template is expressed by n (3 in this example) to represent the maximum number of resolutions used for this template. In this manner, the following problem can be avoided. That is, if too many images with various resolutions are printed on one print sheet of paper, the size of each of the printed images is too small to recognize differences in resolution and image quality among those many images.

Second, samples classified by image attribute are stored on the template according to this embodiment. More specifically, "character images", "dot images", and "photograph images" are extracted from among the image to be output as a sample to print these images in different areas classified by the resolution. It becomes easier to recognize how the difference in resolution affects the appearance of each attribute image by printing the attribute images in different areas classified by the image attribute as described above. Although in this embodiment the three image attributes "character image", "dot image", and "photograph image" are extracted from among the image data acquired by reading the source-document image, the present embodiment is not limited to these image attributes. Furthermore, any image-identifying method that is known to those skilled in the art can be employed.

As a result of sample output using the template shown in FIG. 4, owing particularly to the above-described first and second points, the difference in image quality due to the difference in resolution can easily be identified among sample images output on one print sheet of paper with different resolutions (print conditions). According to the present embodiment, "n" is not limited to 3. Instead, "n" can be set to an appropriate value so as to satisfy the above-described first and second points depending on, for example, the image attribute to be used.

Referring again to FIG. 3, if it is determined in step S502 that the number of resolutions available in the destination MFP is smaller than n=3, the flow proceeds to step S503, where it is determined whether the resolutions in the destination MFP can be covered by the resolutions available in the scanner 2270 of the MFP 220. In other words, it is determined whether all the acquired resolutions available in the destination MFP are the same as the resolutions that can be processed by the MFP 220.

If it is determined in step S503 that all the acquired resolutions can be covered (i.e., the MFP 220 supports the acquired resolutions of the destination MFP), the flow proceeds to step S504, where the image to be output as a sample is read with each of the same resolutions using the scanner 2270. According to this embodiment, this reading is achieved by performing a scan operation with each resolution. Alternatively, only one scan operation may be performed to acquire an image and then image data having a plurality of resolutions may be generated through resolution conversion of the image.

Next, in step S505, the size of the sheet (paper size) of the read-out image is determined. In step S506, the number of divisions of the read-out image is determined.

Figure 5:
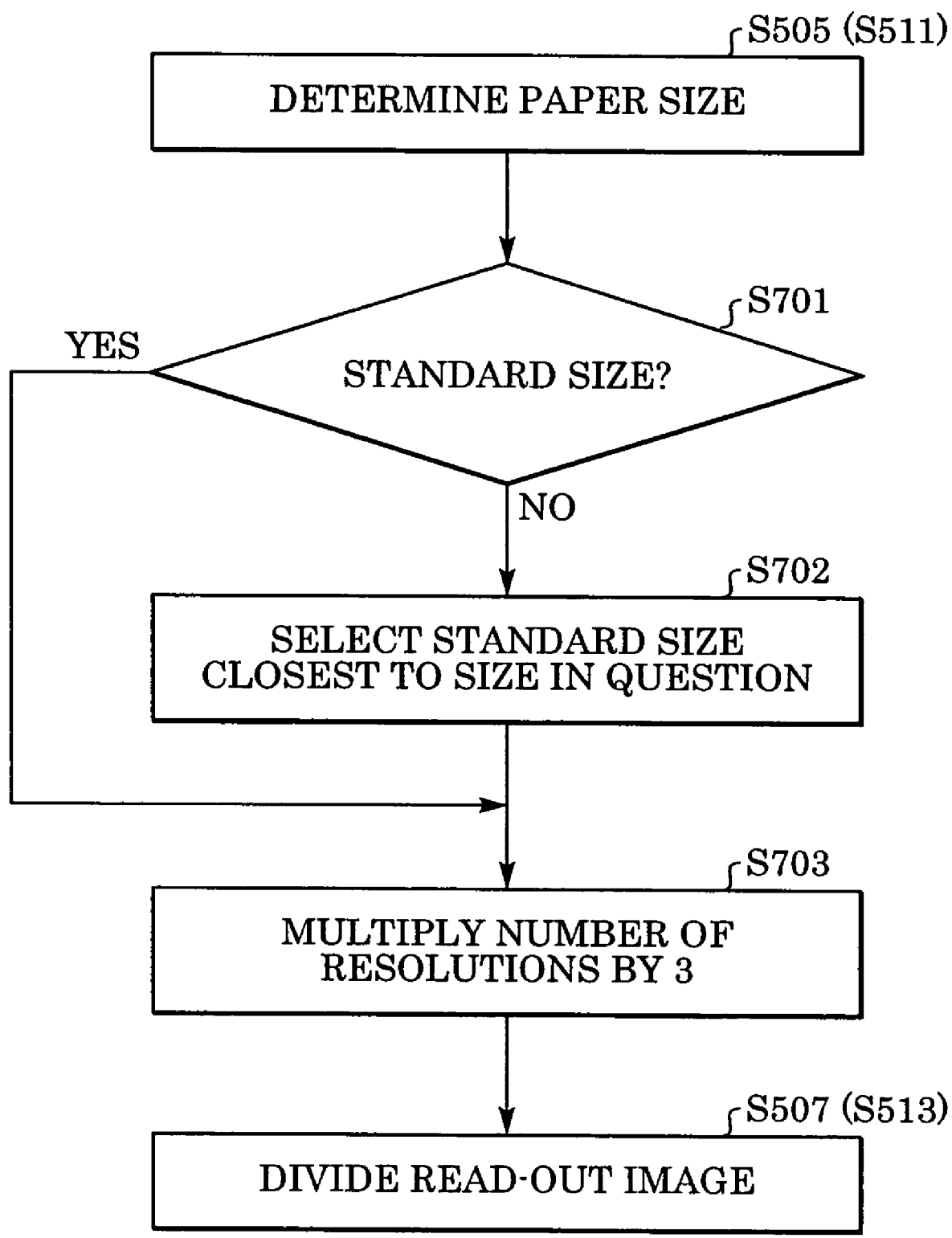
FIG. 5 is a flowchart illustrating in detail the processing of dividing a read-out image in the processing of FIG. 3.

FIG. 5 is a flowchart illustrating in detail the processing of dividing the read-out image. Referring to FIG. 5, in step S701, the size of the print sheet loaded in the printer 2295 of the MFP 220 for outputting a sample is detected. Further, in step S701, it is determined whether the detected paper size (standard size) is identical to the paper size of the read-out image determined in step S505. If the paper size of the read-out image is not identical to the standard size of the paper loaded in the printer 2295, the flow proceeds to step S702, where the standard size that is closest to the paper size of the read-out image and that has long sides and short sides satisfying the condition "the paper size of the read-out image <the standard size" is selected.

If the paper size with which the sample is output is determined in this manner, in step S703 the number of resolutions acquired in step S501 is multiplied by the number of image attributes determined for the template, and the resultant value of the product is set as the number of divided blocks. In this example, the number of image attributes is three including "character image", "dot image", and "photograph". For example, if the number of resolutions is 2, smaller than n=3 allowed for the template, then 2 is multiplied by 3 (the number of image attributes) to produce 6 divisions.

Figure 6:
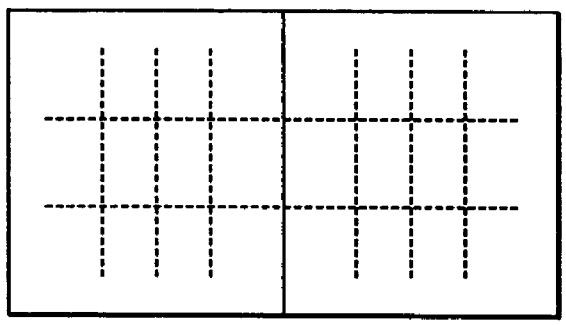
FIG. 6 is a diagram depicting the standard-size sheet of paper and divided blocks on the sheet, referred to in FIG. 5.
Figure 6:
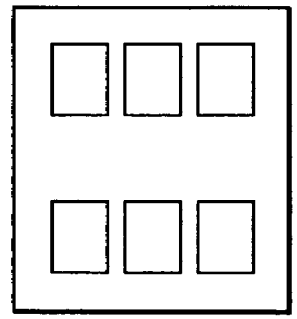
Figure 6:
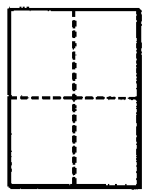
Figure 6:
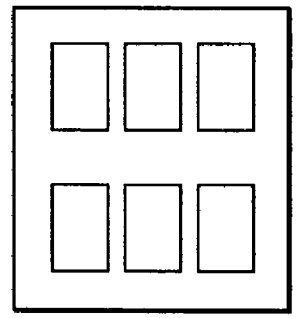
Figure 6:
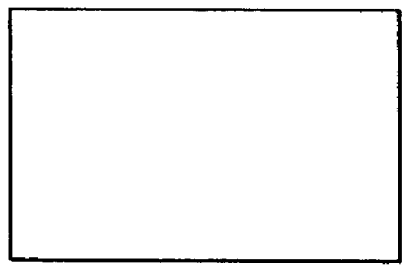
Figure 6:
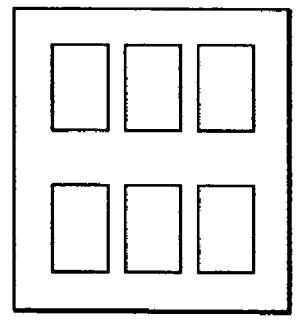

FIG. 6 is a diagram depicting the standard-size sheet of paper and divided blocks on the sheet, referred to in step S702. As shown in FIG. 6, if the size of the sheet of paper read out with the scanner 2270 is "A3", "A5", or "nonstandard", "A4" is selected for the standard-size sheet of paper on which a sample is output. FIG. 6 also shows that the number of divisions is 2×3=6.

Figure 8:
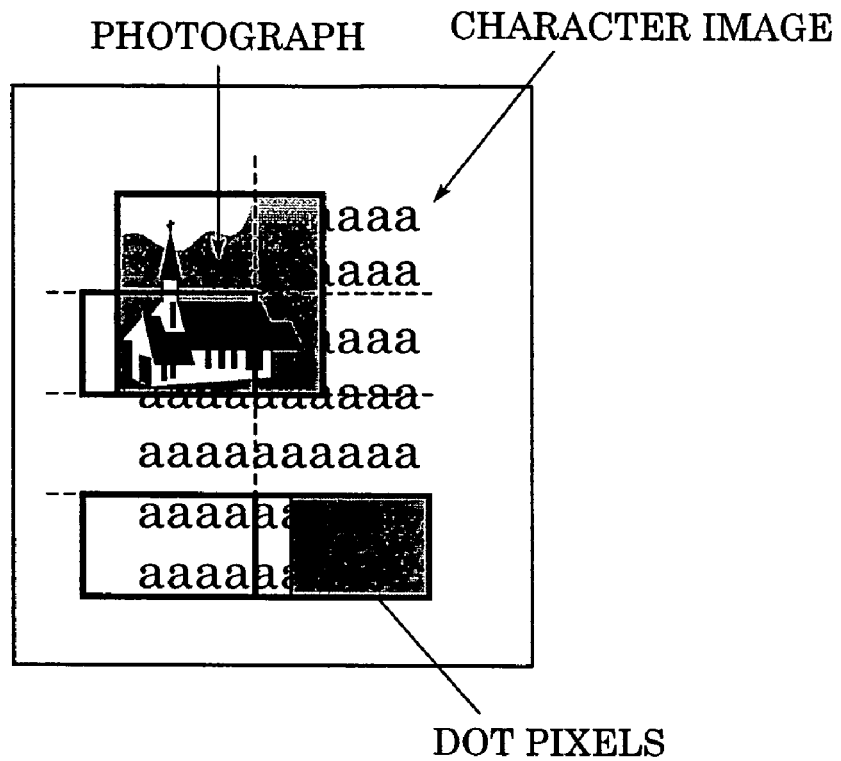
FIG. 8 is a diagram depicting part of the processing of FIG. 3, namely, the processing of dividing a read-out image based on the number of divisions and selecting an area to be printed as a sample from each of these divided image areas (blocks).
Figure 8:
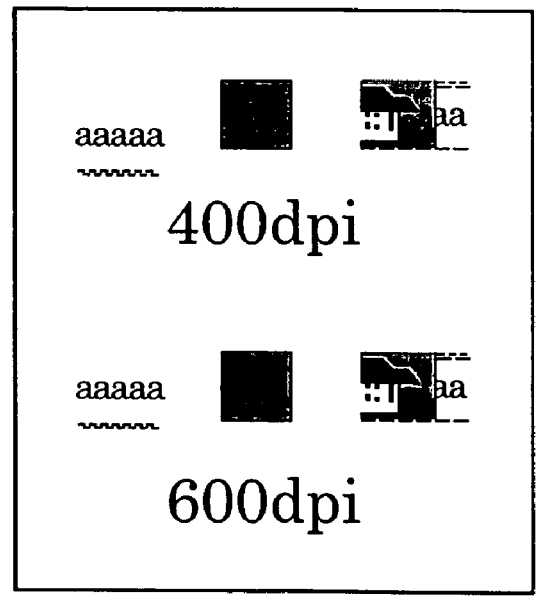

Referring again to FIG. 3, if the number of divisions is determined in step S506, then the read-out image is divided in step S507 based on the number of divisions as shown in FIG. 8, and in step S508 the areas to be printed as sample images are selected from the divided image areas (blocks).

Figure 7:
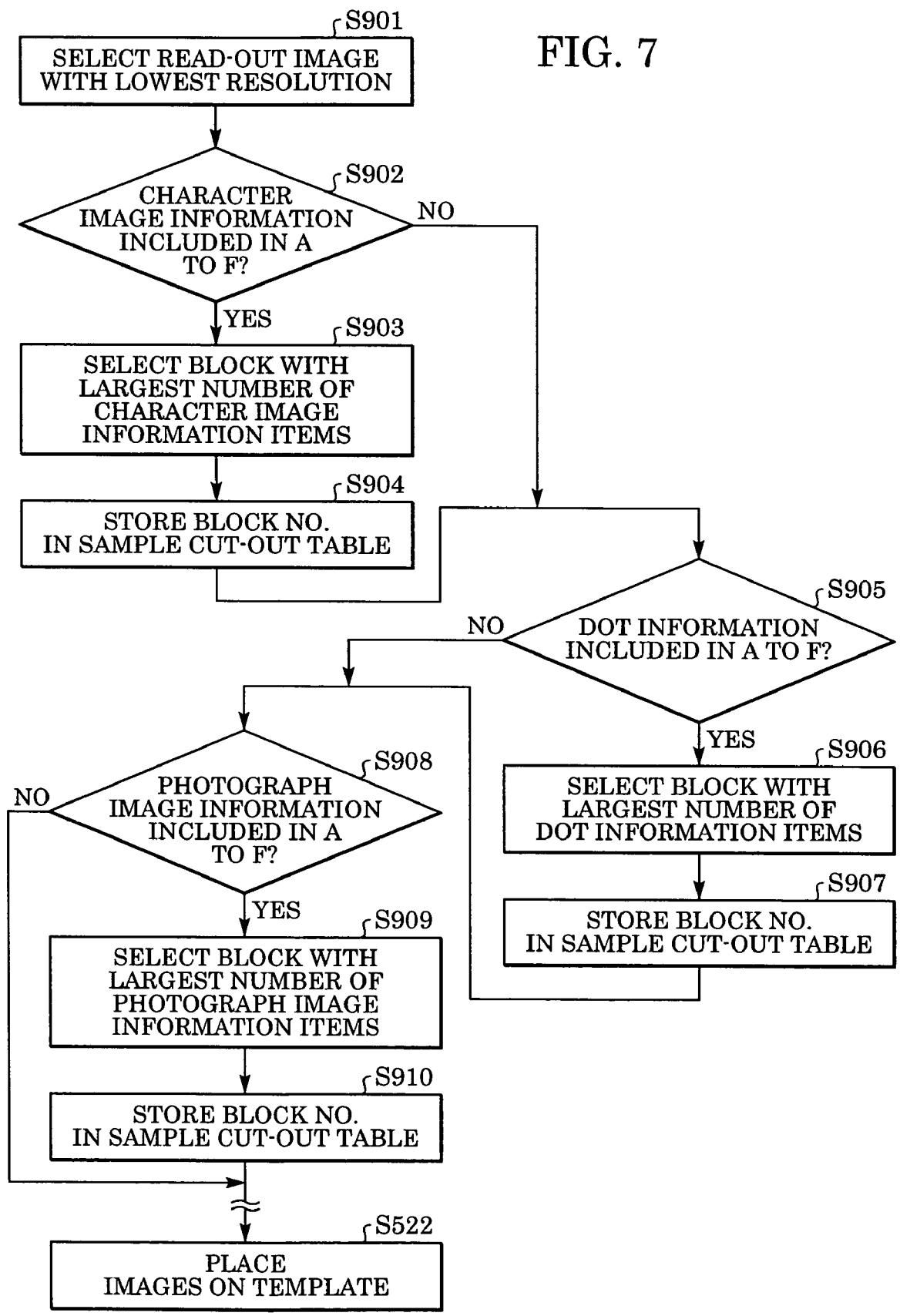
FIG. 7 is a flowchart illustrating in detail area-selection processing of the processing shown in FIG. 3.

FIG. 7 is a flowchart illustrating this area-selection processing in detail.

Figure 9:
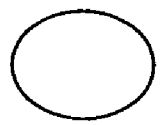
FIG. 9 is a diagram depicting one example of a table showing the number of information items in each area, related to the processing of FIG. 7.

Referring to FIG. 7, in step S901, each divided image included in the image data with the lowest resolution from among the acquired resolutions is acquired. Next, in step S902, it is determined whether a character image exists in each divided image. More specifically, in this step, it is determined whether a character image exists in each division area, and the number of information items about the extracted image (the number of pixels or information about the proportion of the area of character image in the division area) is acquired. These processing operations can be performed with known techniques. For example, the determination as to whether the read-out image data includes characters can be made based on dot isolation, color, edge shape, etc. of the image data. Determination can be made in the same manner for dot images and photograph images. FIG. 9 is a diagram depicting one example of a table showing the number of information items in each area, related to this step.

If it is determined in step S902 that there is a character image, the flow proceeds to step S903, where the table shown in FIG. 9 is referred to select the area with the highest number of information items (the number of pixels) about the character image from among the division areas determined to contain a character image. In the example of FIG. 9, since an area B has the largest number of information items about a character image, the area B is selected. In step S904, the number of the selected area (B in the example of FIG. 9) is stored in the table for sample extraction (not shown in the figure) of the scanner-image processing section 2080 as the number corresponding to the area containing an image to be cut out for printing in the form of a sample image.

If it is determined in step S902 that no character image exists in a division area or after the processing in step S904 is completed, the flow proceeds to step S905, where it is determined whether dot image information is included in each division area in the same manner as with the character image. If it is determined that a dot image exists, the flow proceeds to step S906, where the number of the division area with the largest number of information items (number of pixels) about the dot image is selected in the same manner as with the character image, and in step S907 the number of the area is stored in the above-described table for sample extraction.

Similarly, in step S908, it is determined whether each division area includes photograph image information. If it is determined that there is photograph image information, in step S909 the number of the division area with the largest number of pixels of photograph image is selected from among the division areas containing a photograph image, and in step S910 the number of the selected area is stored in the above-described table for sample extraction.

Referring again to FIG. 3, after cut-out areas (blocks) are selected on the image read out with the lowest resolution in step S508 as described above, in step S509 the images in the same division areas as those determined above are selected on each of the images read out with the resolutions except for the lowest resolution. As a result of the processing described above, the images in the division areas selected on the images read-out with all available resolutions (400 dpi and 600 dpi in the example shown in the same figure) can be acquired as shown in FIG. 8. Thus, the images in the determined areas are placed on the template, classified by image attribute, in the subsequent step S522 and are printed out based on the template in step S523. Then, the current processing ends.

If it is determined in step S503 that covering by the resolutions in the scanner 2270 of the MFP 220 is not possible, the flow proceeds to step S510, where images are read with the resolutions common to both the destination printing apparatus and the scanner 2270 in the MFP 220. Subsequently, in steps S511 to S515, the same processing as in steps S505 to S509 is carried out. Thereafter, in step S516, a predetermined comment "insufficient resolution information" and "not supported" is generated for the resolutions retained only by the destination printing apparatus.

In step S502, if it is determined that the acquired number of resolutions exceeds the number of resolutions storable on the template (n=3), the flow proceeds to step S517, where an image is read with the lowest resolution from among the acquired resolutions. Next, in step S518, a character image, a dot image, or a photograph image is recognized from the read-out image information through image-area separation. In step S519, it is determined which is included more, "character image" or "dot image and photograph image", based on the number of pixels acquired as a result of the above-described recognition.

If the character image has more pixels than the "dot image and photograph", image reading is repeated starting with the lowest resolution until the number of resolutions reaches "n" (3 in this example) in ascending order of resolution. This is done in ascending order because an image including a larger proportion of characters generally has low required resolution, and it is unlikely that samples with high resolution are demanded. On the other hand, if the dot image and photograph image have a larger proportion than the character image in step S519, image reading is repeated starting with the highest resolution until the number of resolutions reaches "n" (3 in this example) in descending order of resolution. This is done in descending order because the user reads out a dot image or photograph image for sample printout probably in order to estimate the reproducibility of the dot or photograph image on the destination printing apparatus. In short, it is likely that samples with high resolution are more demanded than samples with low resolution. After the reading operation in step S520 or S521, the processing in step S511 and the subsequent processing are carried out.

Figure 10A:
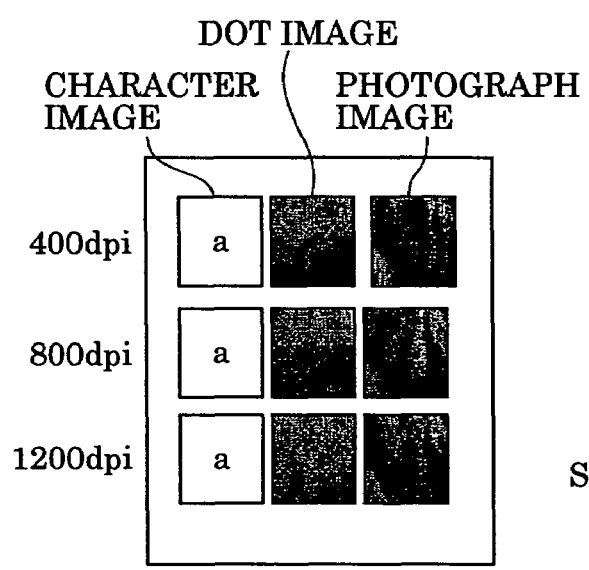
FIGS. 10A and 10B are diagrams depicting examples of sample printing results through the processing of FIG. 3.
Figure 10B:
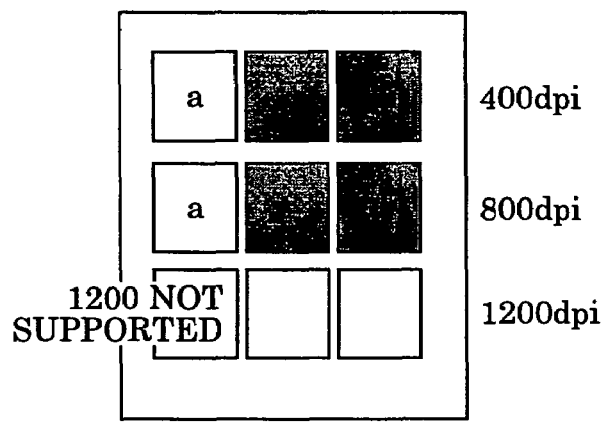

FIGS. 10A and 10B are diagrams depicting examples of sample printing results through the processing of FIG. 3. The example of FIG. 10A shows a case where n=3, more specifically, the read-out resolutions of 400 dpi, 800 dpi, and 1200 dpi. The example of FIG. 10B shows a case where n=2, more specifically, the read-out resolutions of 400 dpi and 800 dpi. This example also indicates that the MFP 220 does not support 1200 dpi.

The user selects the optimal resolution by inspecting the result of this sample print, operates the scanner 2270 to read out an image to be printed with the selected resolution, and transmits the image to the destination MFP for printing.

With the above-described structure, the print information about sample printing placed on the template is divided in areas classified according to the print condition, such as resolution, and image attribute of the read-out image. For this reason, images classified by resolution and attribute can be checked on one print sheet of paper. This allows differences in resolution among sample images to be recognized easily.

Other Embodiments

In the above-described embodiment, the resolution of print information to be transmitted to the destination MFP is set through sample printing. In addition, the present invention is also applied to a case where in an MFP or copy machine having a scanner and a print mechanism or a print system including a scanner and a printer, the resolution of print information to be transmitted from a scanner to the print mechanism in the apparatus or system including that scanner is set by outputting a sample with that print mechanism.

Furthermore, the image attribute is not limited to the above-described character image, dot image, or photograph image. Any image attribute that is extractable or identifiable is acceptable. The print condition is not limited to resolution. Any print condition available in the source printing apparatus and the destination printing apparatus is acceptable.

As described above, the present invention can be applied to an apparatus including a plurality of devices (e.g., host computer, interface device, reader, printer) and an apparatus including one device (e.g., copy machine, facsimile machine).

The present invention can also be realized by providing a computer in an apparatus or a system connected to devices so as to control the devices to achieve the function of the embodiment described by referring to FIG. 3 with software program code for performing the function of the foregoing embodiment and then causing the computer (e.g., a CPU or MPU) of the system or apparatus to operate the devices according to the stored program.

In this case, the program code itself of the above-described software achieves the function of the above-described embodiment. Thus, the program code itself and means for supplying a computer with the program code, such as a storage medium that records the program code, are included in the present invention.

A storage medium storing such program code includes a Floppy® Disk, a hard disk, an optical disk, a magneto-optical disk, a CD-ROM, a magnetic tape, a non-volatile memory card, and a ROM.

As described above, the function of the above-described embodiment is achieved with the execution of the supplied program code read by the computer. In addition, the function of the above-described embodiment may also be achieved by the operating system (OS) or other application software running on the computer that perform all or part of the processing according to the commands of the program code.

Furthermore, the function of the above-described embodiment may also be achieved such that the supplied program code is written to a memory provided in an expansion card disposed in the computer or an expansion unit connected to the computer, and then, for example, the CPU provided on the expansion card or the expansion unit performs all or part of the processing based on commands in the program code.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2004-232725 filed Aug. 9, 2004, which is hereby incorporated by reference herein in its entirety.

What is claimed is:

1. An image processing apparatus for generating image data having a plurality of image conditions from images read out via a scan device and for transmitting the image data to a first print device, the image processing apparatus comprising:
   a generation unit configured to generate image data items for sample printing based on the images read out via the scan device, the image data items corresponding to a plurality of image conditions;
   a division unit configured to divide each of the generated image data items for sample printing into image areas based on a number of image conditions supported by the first print device and a number of image attributes for sample printing;
   a selection unit configured to select one of the image areas for a first image attribute of the image attributes, such that the selected image area includes a maximum number of pixels having the first image attribute, wherein the selection unit selects each one of the image areas for other image attributes than the first image attribute in the same manner as the first image attribute, and wherein the selection unit repeats selecting the each one of the image areas in accordance with a number of the image data items;
   a combination unit configured to combine images in the selected image areas on a template having areas divided according to the image condition and the image attribute; and
   a control unit configured to control a second print device to print the template having the images combined thereon as the image data items for sample printing.

2. The image processing apparatus according to claim 1, wherein the plurality of image conditions are resolutions supported by the first print device.

3. The image processing apparatus according to claim 2, wherein, if a resolution supported by the first print device is not supported by the scan device, the combination unit combines a comment indicating that the resolution is not supported on the template.

4. The image processing apparatus according to claim 1, wherein the first print device differs from the second print device.

5. An image processing method for generating image data having a plurality of image conditions from images read out using a scan device and for transmitting the image data to a first print device, the image processing method comprising steps of:
   generating image data items for sample printing based on images read out using the scan device to pre-check a print result with the first print device, the image data items corresponding to a plurality of image conditions;
   dividing each of the generated image data items for sample printing into image areas based on a number of image conditions supported by the first print device and a number of image attributes for sample printing;
   selecting one of the image areas for a first image attribute of the image attributes, such that the selected image area includes a maximum number of pixels having the first image attribute, wherein each one of the image areas for other image attributes than the first image attribute is selected in the same manner as the first image attribute, and wherein the each one of the image areas in accordance with a number of the image data items is repeatedly selected;
   combining images in the selected image areas on a template having areas divided according to the image condition and the image attribute; and
   causing a second print device to print the template having the images combined thereon as the image data items for sample printing.

6. The image processing method according to claim 5, wherein the combining step includes, if a resolution supported by the first print device is not supported by the scan device, combining a comment indicating that the resolution is not supported on the template.

7. An image processing program stored on a recording medium for causing a computer to perform the image processing method according to claim 5.

* * * * *